No. 799,406. PATENTED SEPT. 12, 1905.
A. P. SCHMUCKER.
PNEUMATIC ROCK DRILL.
APPLICATION FILED OCT. 20, 1902.

3 SHEETS—SHEET 1.

WITNESSES:
C. A. Williams
Geo. B. Rowley.

INVENTOR.
Alfred P. Schmucker
by John H. Roney
ATTORNEY.

No. 799,406. PATENTED SEPT. 12, 1905.
A. P. SCHMUCKER.
PNEUMATIC ROCK DRILL.
APPLICATION FILED OCT. 20, 1902.
3 SHEETS—SHEET 2.
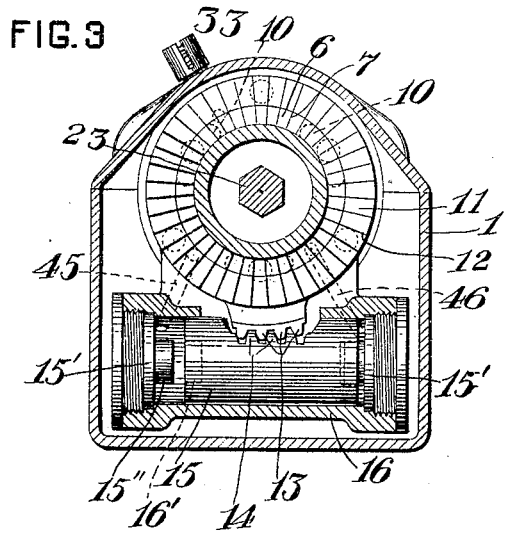
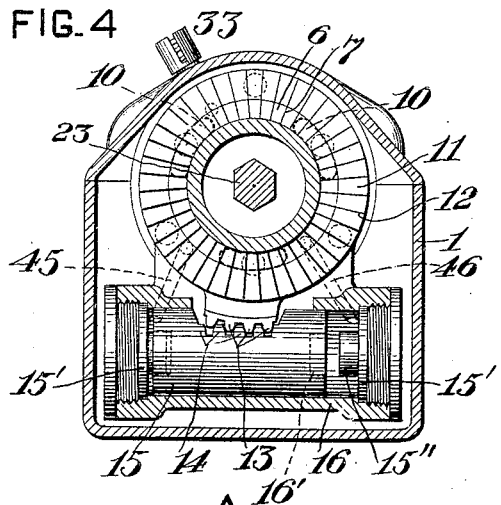
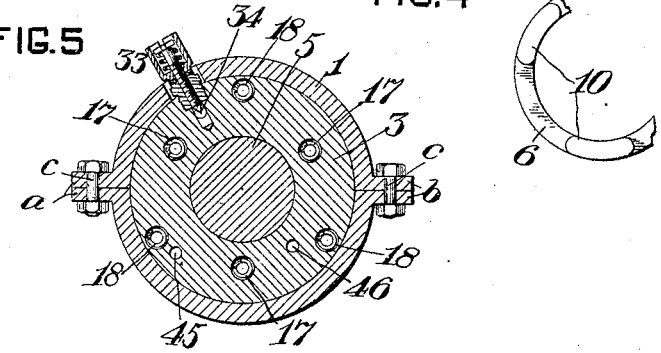
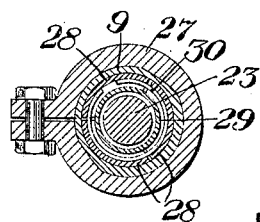
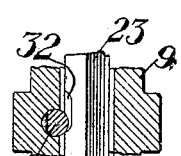
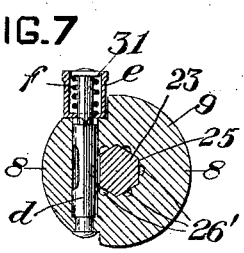
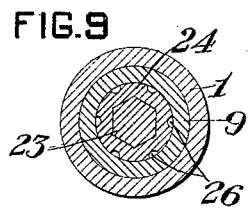
WITNESSES:
C. A. Williams
Geo. B. Rowley
INVENTOR.
Alfred P. Schmucker
by John H. Roney
ATTORNEY.

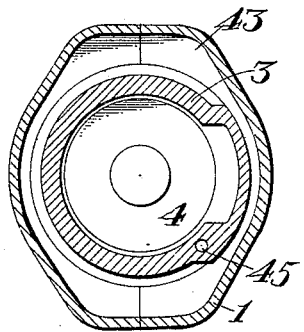
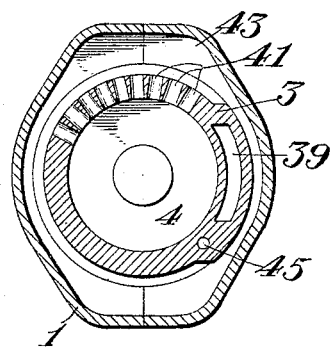
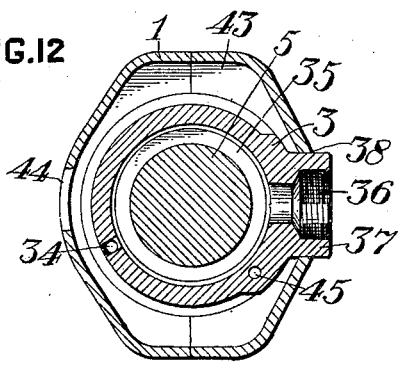
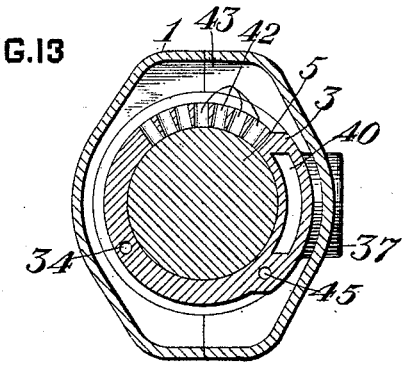
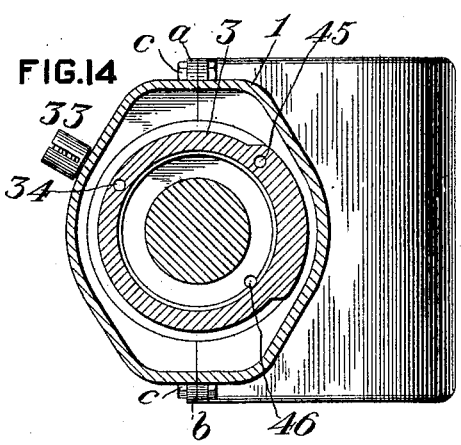

UNITED STATES PATENT OFFICE.

ALFRED P. SCHMUCKER, OF FRANKLIN, PENNSYLVANIA.

PNEUMATIC ROCK-DRILL.

No. 799,406. Specification of Letters Patent. Patented Sept. 12, 1905.

Application filed October 20, 1902. Serial No. 127,901.

*To all whom it may concern:*

Be it known that I, ALFRED P. SCHMUCKER, a citizen of the United States, residing at Franklin, in the county of Venango and State of Pennsylvania, have invented a new and useful Improvement in Pneumatic Rock-Drills, of which improvement the following is a specification.

My invention relates to pneumatically-operated rock-drills.

The objects of my invention are, first, to produce a portable pneumatically-operated tool in which the reciprocating piston-hammer operates as a valve to control its own movement and directly operates as a valve to control the movement of the reciprocating piston which rotates the drill; secondly, to produce means for such devices to blow or clean out the material or debris formed by the drilling operation; and it consists in other novel features of construction hereinafter more specifically described and pointed out, reference being had to the accompanying drawings, in which—

Figure 1:
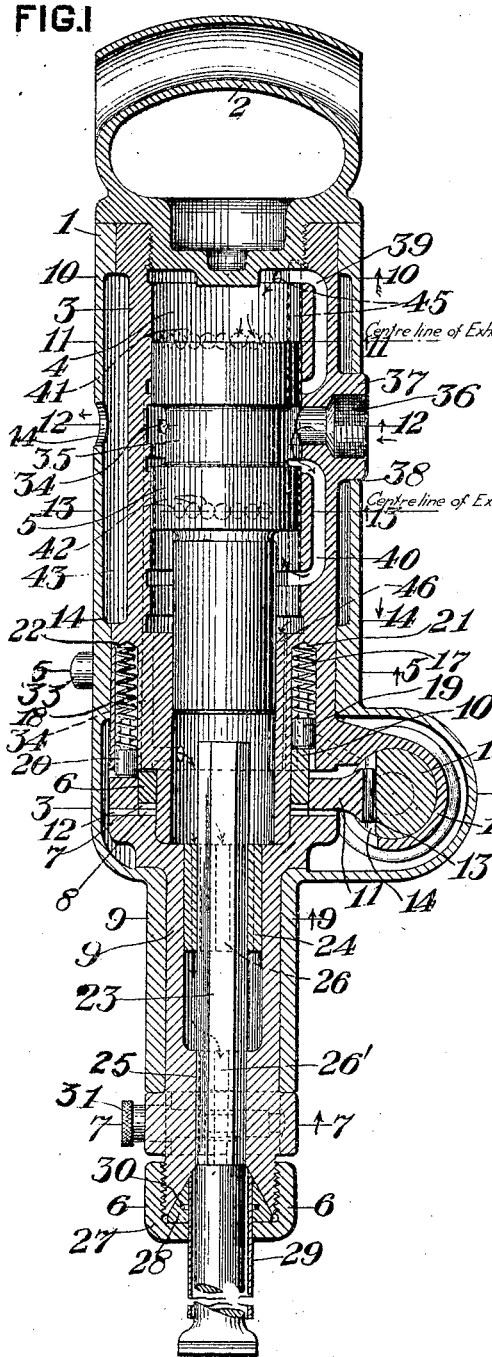
Figure 2:
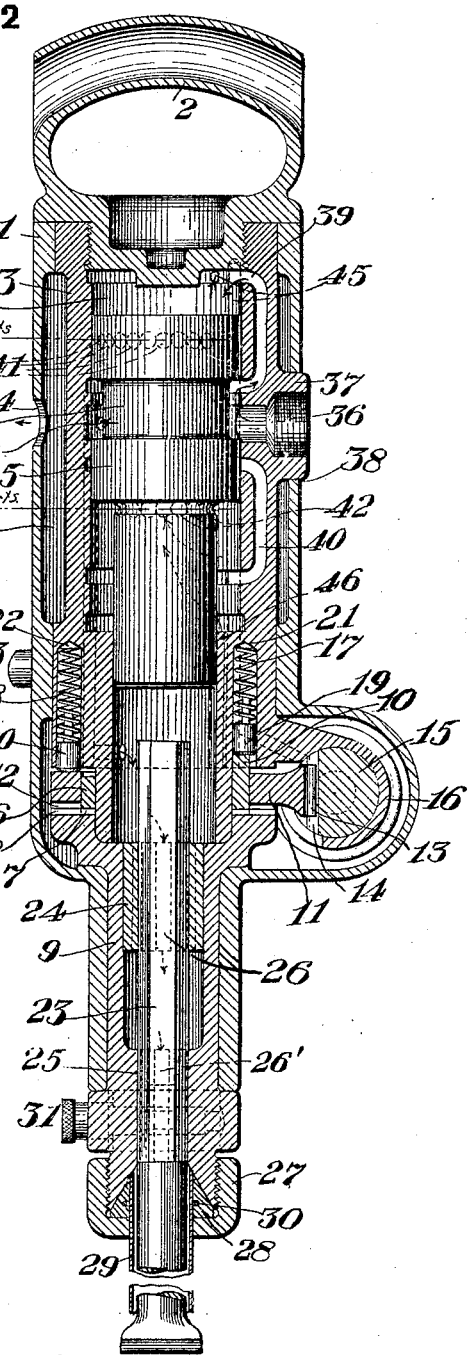

Figure 1 indicates a longitudinal section of my improved pneumatic rock-drill, showing position of piston with relation to the drill or bit when the blow is about to be struck. Fig. 2 indicates a longitudinal section of my improved pneumatic rock-drill, showing the position of the piston with relation to the bit upon the return of the stroke. Fig. 3 is a transverse section on the line 3 3 of Fig. 1, showing position of piston to rotate drill in one position.
Fig. 4 is the same on line 3 3 of Fig. 1, showing the rotating mechanism of the bit in a reverse position to that shown in Fig. 3. Fig. 4$^a$ is a plan view of a portion of the ring 6. Fig. 5 is a transverse section on the line 5 5 of Fig. 1, showing valve for controlling pressure to clean the drill-hole. Fig. 6 is a transverse section on the line 6 6 of Fig. 1, showing clamp to hold sleeve or pipe around the bit. Fig. 7 is a transverse section on the line 7 7 of Fig. 1, showing the locking device to hold bit. Fig. 8 is a transverse section on the line 8 8 of Fig. 7. Fig. 9 is a transverse section on the line 9 9 of Fig. 1, showing air-passages to drill-hole. Fig. 10 is a transverse section on line 10 10 of Fig. 1. Fig. 11 is a transverse section on the line 11 11 of Fig. 1. Fig. 12 is a transverse section on the line 12 12 of Fig. 1. Figs. 13 and 14 are respectively sections on the lines 13 13 and 14 14 of Fig. 1.

Referring to said drawings, 1 is an outer shell which for convenience of construction is formed in two sections which are provided with flanges $a\ b$, adapted to be secured together by bolts $c$. One end of said shell is contracted or of less diameter than the other, and both ends thereof are open to receive the internal operating mechanism. In the end adjacent to the handle 2, which I will designate the "upper" end, a shell 3 is seated, the interior of which is bored to form a cylinder 4, in which a piston 5 is operatively seated. The lower end of said internal shell 3 is contracted and has mounted thereon a ring or disk 6, the lower face of which is provided with teeth 7, which engage teeth 8, formed on the adjacent face of the shell 9, which abuts against the lower end of shell 3, and the upper face or surface of said ring is provided with lugs 10 10, which engage correspondingly-formed recesses in the lower edge of the wall of the cylinder or shell 3 for the purpose hereinafter specified. 11 is a ring mounted upon said ring or disk 6 and is provided with teeth 12, which likewise engage the teeth 8, formed on the adjacent face of the shell or holder 9. Upon one side of said ring 11 teeth 13 are formed, which engage the serrations or teeth 14, formed in the piston 15, which is operatively seated in the transverse cylinder 16, formed on one side of the internal shell. Disks 15', seated in each end of said cylinder, having projections 15'', adapted to enter recesses 16' in the ends of said piston, serve as a cushion to prevent the piston striking upon the heads of said cylinder. The teeth on said rings 6 and 11 are held in engagement with said rotatable holder 9 by the pressure of springs 17 17 and 18 18, the lower ends of which respectively abut against the shoulder on the pins 19 and 20, respectively, and the upper ends thereof contact or engage against the bottoms of the sockets 21 and 22, respectively, formed in the wall of said shell 3. 23 is a drill seated in the shell or holder 9, the upper end of which projects into the lower end of the cylinder formed in the shell 3 and is held against lateral movement by the guide-ring 24, which is seated in the upper end of the shell 9 and the longitudinal bearing 25 in the lower end of said shell. The said guide-ring 24 is provided with a series of orifices 26 for the admission of air to the drill-hole through ports or orifices 26' in the bearing 25 for the purpose of cleaning said hole, as hereinafter specified. The lower end of said shell 9 projects through the opening in the lower end of shell 1 and is screw-threaded for the purpose of receiving a correspondingly-threaded cap 27, which is adapted to hold the cone-shaped washers 28 against the internally-beveled edges of the shell for the purpose of holding the pipe 29, which incloses the lower end of the drill, in position. A split ring 30 is interposed between the washers and the sides of the pipe, the retraction of which when the cap is removed loosens the washers. The said drill is held in position in said shell by the lock mechanism 31, one side of the drill having a small recess 32 formed therein to receive the bolt $d$ of said lock mechanism, one side of said bolt being flat or recessed to admit of the release of said drill when the flattened side of said bolt is turned sufficient to bring it opposite the recess in the drill. The bolt of the lock mechanism is held against rotation by the sleeve $e$, the lower side of which is provided with a projection or projections which engage notches in the wall of the shell 9 and is held therein by the pressure of the spring $f$, mounted on the stem of the bolt between the square head thereof and the bottom of the sleeve. 33 is a valve in the side of said device, adapted to control the admission of air or other pressure through the port 34 for the purpose of cleaning out the debris from the hole in the course of drilling. The said piston 5 is provided with an annular recess 35, intermediate the enlarged portions thereof, which is normally opposite the pressure-supply port 36, formed in the wall of the shell 3 through a boss 37, which projects in a corresponding opening 38 in the shell 1 for the purpose of assisting to maintain said shell 3 secured within said shell 1. The lower end of said piston is contracted and fits neatly in the contracted portion of the cylinder formed in shell 3. Ports 39 and 40 register with the recess in the piston alternately for the purpose of transmitting pressure to the opposite ends of the enlarged portions or heads of said piston alternately, the movements of said piston alternately closing and exposing the ports 41 and 42, respectively, for the purpose of exhausting pressure through said ports into the exhaust-chamber 43, which is formed between the inner wall of the outer shell and the outer wall of the inner shell, and thence to the atmosphere through port 44. The piston 15 is reciprocated simultaneously with the said piston 5 by pressure admitted from the main cylinder to the cylinder 16, in which said piston 15 is seated, through the ports 45 and 46, respectively, and the pressure is exhausted from said cylinder through said ports to and through the ports 41 and 42, thence into the exhaust-chamber through port 44 to the atmosphere. When the drill is completely removed from the tool, the movement of the piston 5 at its lower end is unlimited, and hence rides over port 40, thus closing the same and rendering the device inoperative and preventing damage to any part of the tool from the shock of the piston on the structural walls of the cylinder. In practice if a pneumatic tool is allowed to operate idly the cylinder is very likely to be damaged and cracked so badly as to render it useless. My construction is a safeguard against such an accident.

The operation of my device is as follows, viz: The apparatus being in the position shown in Fig. 2, pressure is admitted to the upper end of the main cylinder 4 through port 39 and simultaneously to one end of the auxiliary cylinder 16 through port 45. The pressure thus admitted to said cylinders causes the piston 5 in cylinder 4 to move toward and strike upon the drill and the piston 15 in the auxiliary cylinder 16 to move toward the opposite end of the cylinder. Every alternate movement of said piston 15 transmitted through the ring 11, with which it is in engagement, to the drill-holder in engagement with said ring causes said drill-holder and the drill secured therein to be rotated the distance of one tooth. Immediately the ports 41 are exposed, as shown in Fig. 1, by the movement of piston 5, as described, pressure is exhausted from the cylinder 16 through port 45 and said ports 41, the port 45 alternating as a supply and exhaust port. Reverse movement of said piston is caused by pressure admitted to the opposite ends of said cylinders, respectively, through the ports 40 and 46, respectively, and pressure exhausted therefrom through the ports 42 and 46 in a manner similar to the exhaust from the opposite ends of said cylinder through ports 41 and 45. The drill-holder and drill therein are held against reverse movement when said piston 15 is reversed by the teeth on ring 6, which slip on the forward movement of the piston and engage the teeth on the holder in the reverse movement, whereas the teeth on ring 11 engage the teeth on the holder in the forward movement and slips the same on the reverse movement thereof. Air is constantly admitted to the drill-hole through port 34 and through the orifices 26 in the guide-ring to clean the same and the pressure thereof regulated by the valve 33.

One of the leading advantages of my device is that the piston in the main cylinder operates as a valve to control its own movement and directly as a valve to admit pressure to opposite ends of the auxiliary cylinder to control the movement of the piston therein which rotates the drill and at the same time performs the function of a hammer to strike or impact upon said drill.

It is obvious that any kind of fluid-pressure may be used in the operation of my improved drill.

What I claim as my invention, and desire to secure by Letters Patent, is—

1. In a portable pneumatically-operable drill, the combination of a cylinder, a piston operable therein, a second cylinder, a piston operable therein, a port connecting one end of the first-mentioned cylinder with the corresponding end of said second-mentioned cylinder, a port connecting the opposite end of the first-mentioned cylinder with the corresponding opposite end of the second-mentioned cylinder, whereby pressure is admitted directly from the first-mentioned cylinder to the corresponding ends of said second-mentioned cylinder, the piston in said second-mentioned cylinder having a rack formed on one side thereof, a serrated ring having a segment of gear engaging said rack, an annulus, a drill-bit holder provided with ratchet-teeth adapted to engage teeth of said serrated ring, and the teeth of said annulus, whereby the said drill-bit holder is rotated and backward movement thereof prevented, and a drill-bit seated in said holder.

2. In a portable pneumatically-operative drill, the combination of a cylinder, a piston operable therein, a second cylinder, a piston operable therein, a port connecting one end of the first-mentioned cylinder with the corresponding end of said second-mentioned cylinder, a port connecting the opposite end of the first-mentioned cylinder with the corresponding opposite end of the second-mentioned cylinder, whereby pressure is admitted directly from the first-mentioned cylinder to the corresponding ends of said second-mentioned cylinder, the piston in said second-mentioned cylinder having a rack formed on one side thereof, a serrated ring having a segment of gear engaging said rack, an annulus, a drill-bit holder provided with ratchet-teeth adapted to engage teeth of said serrated ring, and the teeth of said annulus, whereby the said drill-bit holder is rotated and backward movement thereof prevented, a drill-bit seated in said holder and so positioned with relation to said piston, that when said bit is in operating position, the said piston is in operative position, and when said bit is out of operative position, the said piston is enabled to close the fluid-supply port and render the tool inoperative.

3. In a pneumatic drill, an outer, sectional shell contracted at its lower end, a cylinder seated in said shell and contracted at its lower end, a piston operatively seated in said cylinder, a serrated ring or annulus mounted upon the periphery of said last-mentioned contraction, the segment of a gear formed upon the periphery of said annulus, a transverse cylinder formed at the lower end of said first-mentioned cylinder, a piston operating in said transverse cylinder, a rack formed in said transversely-operating piston adapted to engage with the segment upon said annulus and to impart thereto a reciprocating movement, a shell or drill-bit holder revolubly mounted in the lower end of said outer shell, teeth upon the upper end of said drill-bit holder adapted to engage with the teeth upon said annulus, whereby said drill-bit holder is adapted to be revolved.

4. In a pneumatic drill, the combination with a rotary drill-holder having a ring of ratchet-teeth, of a drill in said holder, a toothed annulus adapted to engage the ring of ratchet-teeth and prevent backward rotation thereof, means to keep the said parts in engagement, a second toothed annulus meshing with the ring of ratchet-teeth on the drill-holder and adapted to turn the drill-holder, a fluid-pressure-operated piston for the drill, and a fluid-pressure-operated piston for operating the second toothed annulus.

5. In a portable pneumatically-operable drill, the combination of a cylinder, a piston operable therein, a second cylinder, a port connecting one end of the first-mentioned cylinder with the corresponding end of said second-mentioned cylinder, a port connecting the opposite end of the first-mentioned cylinder with the corresponding opposite end of the second-mentioned cylinder, the piston of the first-mentioned cylinder controlling, independently of other valve mechanism, the ports connecting said cylinders and also acting as a valve for its own ports whereby pressure is admitted directly from the first-mentioned cylinder to the corresponding end of said second-mentioned cylinder, a drill-bit, and means operated by the pressure in the second cylinder to rotate the drill-bit.

6. A fluid-pressure drill, comprising a main cylinder having a piston-hammer, a revoluble chuck, a tool revoluble with but reciprocable in said chuck, an auxiliary cylinder having a piston, ports leading from the main cylinder to the auxiliary cylinder, and connections between the auxiliary piston and said chuck whereby reciprocation of said piston effects rotation of said chuck.

7. A fluid-pressure drill, comprising a main cylinder having a piston-hammer, a revoluble chuck, a tool revoluble with but reciprocable in said chuck, an auxiliary cylinder having a piston, ports leading from the main cylinder to the auxiliary cylinder, and pawl-and-ratchet connections between the auxiliary piston and said chuck whereby reciprocation of said piston effects rotation of said chuck.

8. A motive-fluid-controlled hammer-piston for striking the drill and an alternating fluid-controlled piston for imparting a rotary movement to the drill.

9. A drill, a reciprocating hammer-piston for striking the drill, a piston for rotating the same, and means for feeding a motive fluid to both sides of the pistons at predetermined intervals.

10. A drill, a motive-fluid-controlled hammer-piston for striking the same, a drill-chuck, a second motive-fluid-controlled piston and a pawl-and-ratchet connection between the second piston and the chuck for imparting a rotary movement to the drill as the piston is operated.

11. A drill, a motive-fluid-controlled hammer-piston for striking the same, a second motive-fluid-controlled piston, a drill-chuck, a ratchet carried thereby and a pawl carried by the second piston for imparting a rotary movement to the drill as the piston is operated.

12. A drill, a reciprocating hammer-piston for striking the same and motive-fluid ducts leading from a source of supply to both sides of the piston, a second piston, a pawl-and-ratchet connection between the piston and drill for imparting a rotary movement to the drill and motive-fluid ducts leading to the opposite sides of the second piston, the movement of the second piston being controlled by the movement of the reciprocating hammer-piston.

In testimony whereof I have hereunto signed my name in the presence of two subscribing witnesses.

ALFRED P. SCHMUCKER.

In presence of—
CLARENCE A. WILLIAMS,
JOHN H. RONEY.